July 27, 1937.   G. A. HOBART   2,088,416
PHOTOELECTRIC RELAY
Filed Jan. 4, 1936
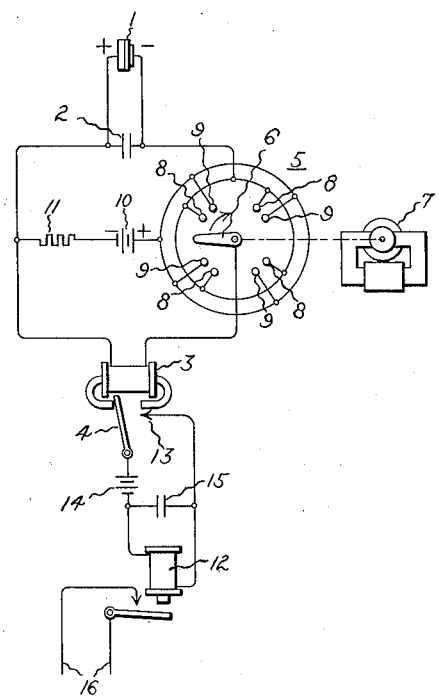
Inventor:
Garret A. Hobart,
by Harry E. Dunham
His Attorney.

Patented July 27, 1937

2,088,416

UNITED STATES PATENT OFFICE 2,088,416

PHOTOELECTRIC RELAY

Garret A. Hobart, Tuxedo Park, N. Y., assignor to General Electric Company, a corporation of New York Application January 4, 1936, Serial No. 57,573

6 Claims. (Cl. 250—41.5)

My invention relates to photoelectric relay apparatus. One object of my invention is the provision of improved apparatus of this character by which the response to light of a photoelectric device may be suitably amplified without the use of electron discharge amplifying apparatus. Another object of my invention is the provision of improved apparatus of this character which is simple in construction, reliable in operation and inexpensive to manufacture.

In accordance with my invention I employ a capacitor of relatively large capacitance connected to be charged from the circuit of the photoelectric device. At regular intervals a time controlled switch connects a current actuated device across the capacitor, the sudden discharge of the capacitor operating the current device. A regular intermittent operation of the current device is an indication that the light flux affecting the photoelectric device is above a predetermined amount. As a means for giving a signal, for example by the single closing of a circuit, when the above-mentioned current device is operating in said recurring manner, I preferably employ a relay as the current actuated device and employ a second relay in a circuit controlled by the first relay. The second relay is constructed to have a retarded action, as by shunting its winding with a large capacitor whereby the second relay will remain closed as long as the first relay is operating in the above-mentioned intermittent manner.

My invention will be better understood from the following description taken in connection with the accompanying drawing, and its scope will be pointed out in the appended claims.

In the single figure of the drawing which is a circuit diagram of an embodiment of my invention I have represented the photoelectric device 1 of the apparatus as a photoelectric cell, that is, a photoelectric device which produces a voltage, although only a few millivolts, in one direction when subjected to light. I have represented such a cell as being of the so called "blocking layer" type. As is well known, such cells being voltage generators do not require a separate source of voltage in circuit therewith and are characterized by low impedance and high current. Connected across the device 1 to be charged thereby is the relatively large capacitor 2 which may have a capacitance, for example, of 20 mf. to 100 mf. The charge on capacitor 2 is allowed to discharge at regular recurring intervals through the current responsive device 3 which on the drawing is represented as a polarized relay having the armature 4. The winding of this relay is connected at regular intervals across the capacitor 2 by any suitable timing switch. Such a switch is represented at 5 as comprising the rotatable switch arm 6 which is rotated by any suitable constant speed driving apparatus, such for example as the synchronous motor 7. In its rotative movement the arm 6 contacts successively with the equally spaced fixed contacts 8 whereby the capacitor 2 may successively discharge through the winding of relay 3. In the interest of maximum sensitiveness of the device 3 to the discharge current of the capacitor 2 I preferably employ a polarized relay, as shown, for this device and also I provide means for reversing the current through the relay winding after each energization from the capacitor. For the latter means I construct the switch 5 with a series of intermediate equally spaced fixed contacts 9 which connect with the battery 10 and resistor 11 to supply the desired reverse current through the winding of the polarized relay 3 after each energization thereof from capacitor 2.

As long as the light flux reaching the photo device 1 is above a predetermined amount the armature of relay 3 will oscillate in synchronism with the operation of the switch 5, the continued operation of relay 3 being an indication that the value of the light is above that amount. When the light is below that amount the current supplied to the relay 3 from the capicitor 2 is insufficient to actuate the relay and the armature 4 remains in the position illustrated. In order that a signal may be given, as for example by the closing of a circuit, in response to the continued oscillation of armature 4, I have provided the relay 12 which connects with the armature 4 and fixed contact 13 of relay 3 through the battery 14. Across the winding of relay 12 is the relatively large capacitor 15, which for example may have a capacitance of 20 mf. The effect of this capacitor 15 is to slow down the operation of relay 12 such that as long as the armature 4 of relay 3 is oscillating, relay 12 remains energized and holds the circuit 16 controlled thereby closed.

While I have represented the photoelectric device 1 as a photoelectric cell, my invention is not limited to the use of such a device as various other forms of photoelectric devices also may be used if desired.

I have chosen the particular embodiment described above as illustrative of my invention and it will be apparent that various modifications may be made without departing from the spirit and scope of my invention.

What I claim as new and desire to secure by Letters Patent of the United States, is:

1. A photoelectric relay comprising a photoelectric device, a capacitor permanently connected therewith to be charged in accordance with the illumination of the device, a current responsive device, means for connecting said current responsive device across said capacitor at regular intervals and apparatus responsive to a recurring operation of said current responsive device at said intervals.

2. A photoelectric relay comprising a photoelectric device, a capacitor permanently connected therewith to be charged in accordance with the illumination of the device, a current relay, time controlled means for connecting said current relay across said capacitor at recurring intervals and apparatus operative in response to a continued recurring operation of said relay.

3. A photoelectric relay comprising a photoelectric device, a capacitor permanently connected therewith to be charged in accordance with the illumination of the device, a current relay, time controlled means for connecting said relay across said capacitor at recurring intervals and slow responding relay apparatus controlled by said current relay.

4. A photoelectric relay comprising a photoelectric device, a capacitor permanently connected therewith to be charged in accordance with the illumination of the device, a current relay, time controlled means for connecting said relay across said capacitor at recurring intervals, a second relay controlled by said current relay and a capacitor connected across said second relay for making it slow to respond.

5. A photoelectric relay comprising a photoelectric device, a capacitor connected therewith to be charged in accordance with the illumination of the device, a polarized relay, time controlled means for connecting said relay across said capacitor at regular intervals, means controlled by said means for reversely energizing said relay prior to each time it is connected across said capacitor and a slow responding relay connected to be controlled by said polarized relay.

6. A photoelectric relay comprising a photoelectric cell, a capacitor connected to be charged thereby, a polarized relay, a battery, a time switch having contacts arranged to connect said relay across said capacitor to be energized thereby in one sense at recurring short intervals and having other contacts arranged to connect said relay with said battery to be energized thereby in the opposite sense prior to each energization in said one sense and a second relay having a capacitor of relatively large value connected across the winding thereof controlled by said polarized relay.

GARRET A. HOBART.